(12) United States Patent
Komatsu (10) Patent No.: US 9,228,504 B2
(45) Date of Patent: Jan. 5, 2016

(54) DIESEL ENGINE

(71) Applicant: ISUZU MOTORS LIMITED, Tokyo (JP)

(72) Inventor: Akira Komatsu, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/376,152

(22) PCT Filed: Feb. 7, 2013

(86) PCT No.: PCT/JP2013/052827
§ 371 (c)(1),
(2) Date: Aug. 1, 2014

(87) PCT Pub. No.: WO2013/121962
PCT Pub. Date: Aug. 22, 2013

(65) Prior Publication Data
US 2014/0366529 A1 Dec. 18, 2014

(30) Foreign Application Priority Data
Feb. 13, 2012 (JP) ................................. 2012-028787

(51) Int. Cl.
*F02B 33/44* (2006.01)
*F02B 29/04* (2006.01)
(Continued)

(52) U.S. Cl.
CPC ............ *F02D 13/0203* (2013.01); *F02B 37/00* (2013.01); *F02B 37/007* (2013.01);
(Continued)

(58) Field of Classification Search
CPC ...... F02B 37/007; F02B 37/013; F02B 37/00; F02B 37/16; F02B 37/24; F02B 37/22; F02M 25/0711; F02M 25/07; F02M 25/0707; F02M 25/0715; F02D 13/06; F02D 13/0203; F02D 17/02; F02D 23/00; F02D 13/02; Y02T 10/144; F01N 2900/1612
USPC ........... 60/612, 599, 605.1, 605.2; 123/559.1, 123/562, 563
See application file for complete search history.

(56) References Cited

U.S. PATENT DOCUMENTS 8,234,864 B2 * 8/2012 Easley et al. ..................... 60/602
8,250,866 B2 * 8/2012 Styles ................ F02M 25/0711
60/605.2
(Continued)

FOREIGN PATENT DOCUMENTS

JP         2-112619        4/1990
JP       2001-329874      11/2001
(Continued)

OTHER PUBLICATIONS

Patent Abstracts of Japan, Publication No. 02-112619, published Apr. 25, 1990.
(Continued)

*Primary Examiner* — Thai Ba Trieu
*Assistant Examiner* — Jason T Newton
(74) *Attorney, Agent, or Firm* — Staas & Halsey LLP (57) ABSTRACT

First and second turbochargers for supercharging a first cylinder group which continues or stops an operation by a valve stopping mechanism for reduced cylinders, and a second cylinder group which stops or continues the operation by the valve stopping mechanism for reduced cylinders, respectively, and a third turbocharger in which air from the first and second turbochargers is supplied to the first and second cylinder groups via separate independent intake passages, to supercharge the first and second turbochargers. If a reduced-cylinder operation system provided with this valve stopping mechanism is provided in addition to the turbo-charging system, a drop in a supercharging amount during a reduced-cylinder operation is prevented, a sufficient air amount is supplied into operating cylinders, deterioration of combustion in the operating cylinders and deterioration of a state of an exhaust gas are prevented, and fuel efficiency is improved.

2 Claims, 9 Drawing Sheets

(51) Int. Cl.
| | |
|---|---|
| *F02B 33/00* | (2006.01) |
| *F02M 25/07* | (2006.01) |
| *F02D 17/02* | (2006.01) |
| *F02D 13/02* | (2006.01) |
| *F02B 37/00* | (2006.01) |
| *F02B 37/007* | (2006.01) |
| *F02B 37/013* | (2006.01) |
| *F02B 37/22* | (2006.01) |
| *F02D 13/06* | (2006.01) |
| *F02D 23/00* | (2006.01) |
| *F02B 37/24* | (2006.01) |
| *F02B 37/16* | (2006.01) |

(52) U.S. Cl.
CPC ............... *F02B37/013* (2013.01); *F02B 37/16* (2013.01); *F02B 37/22* (2013.01); *F02B 37/24* (2013.01); *F02D 13/02* (2013.01); *F02D 13/06* (2013.01); *F02D 17/02* (2013.01); *F02D 23/00* (2013.01); *F02M 25/0711* (2013.01); *F01N 2900/1612* (2013.01); *Y02T 10/144* (2013.01)

(56) References Cited

U.S. PATENT DOCUMENTS 9,068,500 B2 *   6/2015   Weber ................... F02B 37/002

2012/0096856 A1 *   4/2012   Rutschmann ......... F01N 13/107
60/612

FOREIGN PATENT DOCUMENTS

| JP | 2004-225561 | 8/2004 | |
|---|---|---|---|
| JP | 2005-009343 | 1/2005 | |
| JP | 2006-177191 | 7/2006 | |
| JP | 2010-223040 | 10/2010 | |
| JP | 2010-223126 | 10/2010 | |
| JP | 2011-220215 | 11/2011 | |
| JP | 2011-231683 | 11/2011 | |
| JP | 2013249747 A * | 12/2013 | ............. F02D 17/02 |

OTHER PUBLICATIONS

Patent Abstracts of Japan, Publication No. 2004-225561, published Aug. 12, 2004.
Patent Abstracts of Japan, Publication No. 2006-177191, published Jul. 6, 2006.
Patent Abstracts of Japan, Publication No. 2010-223040, published Oct. 7, 2010.
Patent Abstracts of Japan, Publication No. 2010-223126, published Oct. 7, 2010.
Patent Abstracts of Japan, Publication No. 2011-231683, published Nov. 17, 2011.
International Search Report mailed Mar. 12, 2013, in corresponding International Patent Application No. PCT/JP2013/052827.

* cited by examiner

| Fuel Injection Amount (mm³/st) \ Engine Speed (rpm) | 500 | 1000 | 1500 | 2000 | 2500 | 3000 | 3500 | 4000 (kPa) |
|---|---|---|---|---|---|---|---|---|
| 10 | 2.5 | 5 | 7.5 | 10 | 12.5 | 15 | 17.5 | 20 |
| 20 | 5 | 10 | 15 | 20 | 25 | 30 | 35 | 40 |
| 30 | 7.5 | 15 | 22.5 | 30 | 37.5 | 45 | 52.5 | 60 |
| 40 | 10 | 20 | 30 | 40 | 50 | 60 | 70 | 80 |
| 50 | 12.5 | 25 | 37.5 | 50 | 62.5 | 75 | 87.5 | 100 |
| 60 | 15 | 30 | 45 | 60 | 75 | 90 | 105 | 120 |
| 70 | 17.5 | 35 | 52.5 | 70 | 87.5 | 105 | 122.5 | 140 |
| 80 | 20 | 40 | 60 | 80 | 100 | 120 | 140 | 160 |
| 90 | 22.5 | 45 | 67.5 | 90 | 112.5 | 135 | 157.5 | 180 |
| 100 | 25 | 50 | 75 | 100 | 125 | 150 | 175 | 200 |

DIESEL ENGINE

CROSS-REFERENCE TO RELATED APPLICATIONS

This application claims the benefit under 35 U.S.C. Section 371, of PCT International Application No. PCT/JP2013/052827, filed Feb. 7, 2013, and under 35 U.S.C. §119 of Japanese Patent Application No. 2012-028787, filed Feb. 13, 2012, the contents of which are incorporated herein by reference.

TECHNICAL FIELD

The present invention relates to a diesel engine provided with a reduced-cylinder operation system provided with a valve stopping mechanism for temporarily stopping intake/exhaust valves in addition to a turbo-charging system.

BACKGROUND ART

Currently, regulation of exhaust gas on an internal combustion engine (engine) for automobiles and industries using an internal combustion engine has become strict year by year. In addition, as one of measures against global warming, introduction of strict fuel economy regulation has been examined latterly. Each automaker has proceeded with research and development relating to various devices for improving engine performance such as exhaust gas performance, fuel economy and the like in order to respond to these regulations.

The internal combustion engines are roughly divided into a gasoline engine and a diesel engine depending on a difference in a fuel to be used. Since the gasoline engine has lower heat efficiency and poorer fuel efficiency as compared with the diesel engine, research and development for improvement of heat efficiency have been made in order to improve the problems, and development of various devices for reduction of engine friction by making intake/exhaust valve mechanisms and auxiliary machines variable and the like has rapidly progressed.

On the other hand, in the diesel engine, research and development on devices such as high-pressure injection, high pressure charging and the like have rapidly progressed latterly, but the research is delayed as compared with the gasoline engine in the area of fuel efficiency improvement. Moreover, a difference in fuel efficiency from the gasoline engine has been increasingly narrowing, and in view of a prospective introduction of fuel economy regulation in addition to the strict exhaust gas regulation, research and development for improving the fuel efficiency of the diesel engine is important.

Methods for improving the fuel efficiency of the diesel engine are roughly divided into two types. One of them is a method of reducing fuel use by improving heat efficiency through improvement of combustion in an engine cylinder. Regarding this method, since heat efficiency of the diesel engine has been already at an extremely high level as compared with that of the gasoline engine, even if the heat efficiency could be improved, much better fuel efficiency cannot be expected, and further improvement of the heat efficiency is extremely difficult.

Another method is to reduce friction of an engine main body and an engine auxiliary machine, which has been actively employed in the gasoline engine, and development of similar devices relating to this method has progressed also in the diesel engine. There are various types of friction, but almost a half thereof is caused by a pumping loss of an engine.

The pumping loss of the engine will be described. An illustrated work of an engine is expressed in general by a "P-V diagram" of a pressure in an engine cylinder with an engine cylinder capacity ($cm^3$: lateral axis) and an engine cylinder pressure (MPa: vertical axis). The pumping loss of an engine is a region located on a lower side of this "P-V diagram", and an area of this region becomes a loss workload. That is, friction generated by an engine during an exhaust stroke in which a piston is raised after combustion of the engine, an exhaust valve is opened, and an exhaust gas in the cylinder is pushed out and during an intake stroke in which the piston is lowered, an intake valve is opened, and new air is introduced into the cylinder, is the pumping loss.

This pumping loss occurs similarly in the gasoline engine and the diesel engine, but in the case of the gasoline engine, a mixture ratio between a fuel and an air amount needs to be made constant, unlike the diesel engine. Thus, an intake throttle valve needs to be provided in an intake line in the gasoline engine, and the pumping loss becomes larger due to its influence than in the case of the diesel engine. However, in the recent gasoline engines, there is a tendency of removing this intake throttle by changing an operating amount of the intake valve to adjust a mixture ratio between the fuel and the air amount. As a result, the pumping loss of the gasoline engine is getting closer to that of the diesel engine in recent years.

Moreover, in a part of vehicles equipped with the gasoline engine, a reduced-cylinder operation system for improving fuel efficiency by reducing the pumping loss has been already employed. In this reduced-cylinder operation system, a part of intake/exhaust valves are stopped depending on an operation state of an engine so as to reduce the number of operating cylinders, and fuel efficiency is improved by reducing the pumping loss as the entire cylinder. In this reduced-cylinder operation system, by stopping the intake/exhaust valves, the line in the above "P-V diagram" becomes substantially one line, and an area of the pumping loss becomes substantially zero. Thus, drastic improvement of the fuel efficiency of the engine can be realized.

In this method of stopping the intake/exhaust valves, various proposals have been already made such as a use of an electromagnetic valve, a structure in which a rocker arm is divided into two parts, and a connecting pin is made to slide by a hydraulic pressure and the like to make a valve lose motion and the like, and they have been already employed in mass production in gasoline engines.

However, they have not employed in mass production in the diesel engines. The reason for that is a drop in supercharging amount. Unlike gasoline engines, if a large amount of air excess ratio is not ensured with respect to a theoretical air amount required by a fuel inputted into the engine, combustion of the engine deteriorates in the diesel engine. Thus, in the current diesel engine, it is a general practice to perform turbo-charging by compressing and turbo-charging air by a turbocharger operated by using exhaust energy of an exhaust gas. Thus, if the reduced-cylinder operation system is employed for the diesel engine, the pumping loss is drastically reduced, but to the contrary, a large decrease of a flow rate of the exhaust gas shifts an operating point of the turbocharger, which largely changes an operation region of this turbo, and as a result, the turbocharger cannot work sufficiently, and a supercharging amount of the engine drops. As a result, combustion of the engine deteriorates, fuel efficiency becomes poor, and comprehensive fuel efficiency performance deteriorates.

The large drop of the supercharging amount will be described in more detail. Regarding a stop cylinder in the reduced-cylinder operation system, due to an influence of an increase in vibration when a number of engine cylinders in activating are decreased, it is a general practice that two cylinders are stopped in the case of four cylinders and three cylinders are stopped in the case of six cylinders. For example, if a half of the cylinders are stopped in a light load when the turbocharger is not sufficiently operating, an exhaust gas flow rate of the engine also becomes approximately a half, and a large shift is made to the left on a turbo map. When this is considered on a turbo compressor map expressed by a gas flow rate (lateral axis) and a pressure ratio (vertical axis) between an intake and an outlet of the turbocharger, the condition enters into the lowest and the leftmost position in a region where it is not operating as the turbocharger. Therefore, even if a fuel is slightly increased and an engine load is raised from this state, sufficient supercharging cannot be obtained from the turbocharger, and thus, fuel efficiency improvement of the engine cannot be realized.

In relation with that, as described in Japanese patent application Kokai publication No. 2010-223040 (Patent Document 1), for example, in order to be able to continue exhaust gas recirculation without causing a trouble in a turbocharger even if the reduced-cylinder operation is performed in a turbo-charging engine, a method and a device for exhaust gas recirculation of a turbo-charging engine are proposed by providing a low-pressure exhaust gas recirculation ("EGR") loop and a high-pressure EGR loop, recirculating the exhaust gas by selecting the low-pressure EGR loop during a reduced-cylinder operation so that the full amount of the exhaust gas passes through the turbocharger, while by recirculating the exhaust gas by selecting the high-pressure EGR loop or the both of the high-pressure EGR loop and the low-pressure EGR loop during a normal operation when the reduced-cylinder operation is not performed.

However, with this method and device, though a drop in the turbo-charging amount by the EGR can be prevented by holding the supercharging amount high by using the low-pressure EGR rather than the high-pressure EGR during the reduced-cylinder operation, it does not reach the supercharging amount during a normal time when operating on a full-cylinder basis, and also, since the supercharging amount lowers in a reduced-cylinder operation state even if the EGR is not used, the turbo operating point lowers and the engine fuel efficiency deteriorates, and thus, a problem is caused that a drop in the supercharging amount of turbo-charging by the reduced-cylinder operation cannot be prevented. Moreover, since the exhaust gas is made to pass through the turbocharger and an intercooler in the low-pressure EGR, a problem of corrosion such as oxidation occurs in components of those paths, which leads to a problem that completion as a system is extremely difficult.

Moreover, as described in Japanese patent application Kokai publication No. 2006-177191 (Patent Document 2), for example, in order to improve shortage of a supercharging amount of a cylinder operating by employment of the reduced cylinder system, an engine in which a plurality of turbochargers are attached by employing small-sized turbochargers with respect to a base turbocharger is proposed.

However, this engine has a problem that engine performance or particularly, fuel efficiency is deteriorated in a full-load operation region other than the reduced cylinder operation region. That is, a large-sized diesel engine has fuel efficiency better than that of a small-sized diesel engine in general due to a great influence by a difference in turbo efficiency, and this turbo efficiency is extremely higher in the large-sized turbochargers than in the small-sized turbochargers in general, and moreover, its region is also large. Therefore, in this engine, though the shortage in the supercharging amount generated in the reduced cylinder operation can be improved, the engine performance or particularly, fuel efficiency is deteriorated by attachment of small-sized turbochargers with respect to the engine performance based on the full-cylinder operation with a full load.

Figure 7:
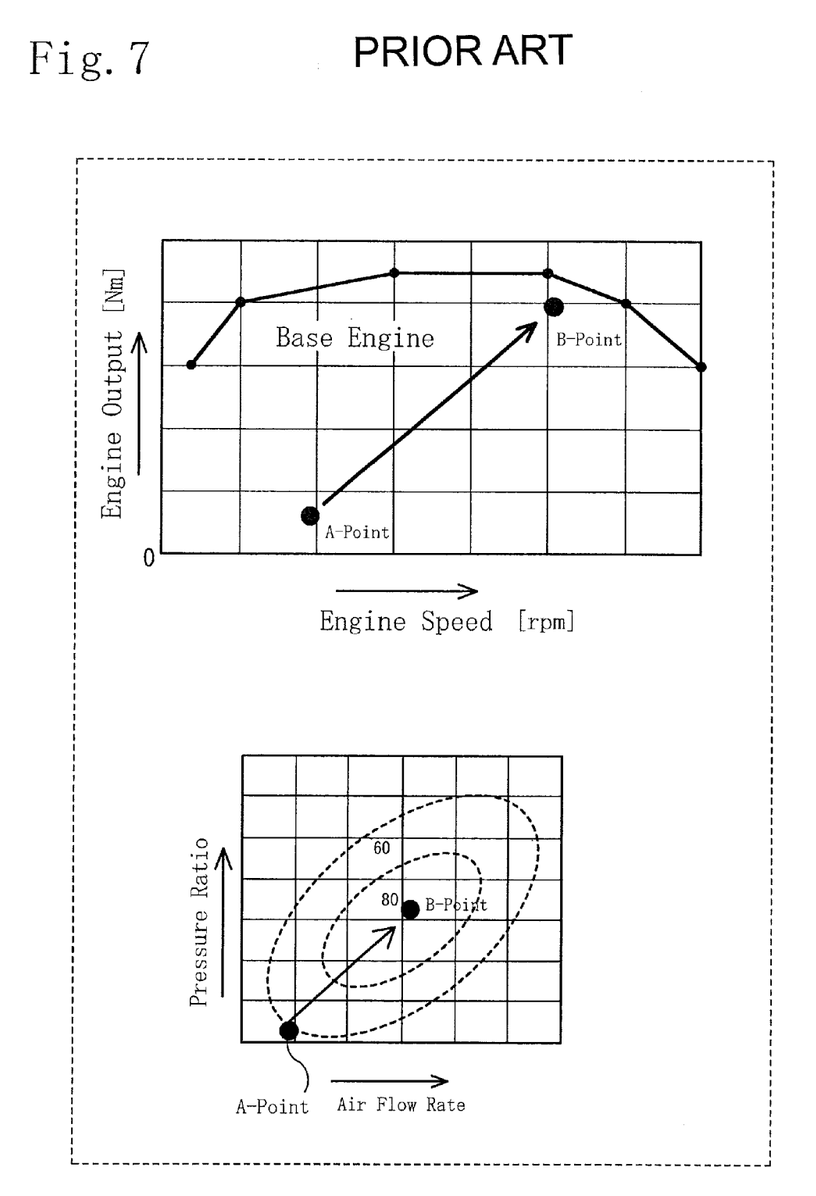
FIG. 7 is a diagram illustrating a graph of "engine speed and engine output" and a graph of "compressor map (air flow rate and pressure ratio)" on the basis of an image of a system of a prior-art single-stage supercharging type normal engine.
Figure 8:
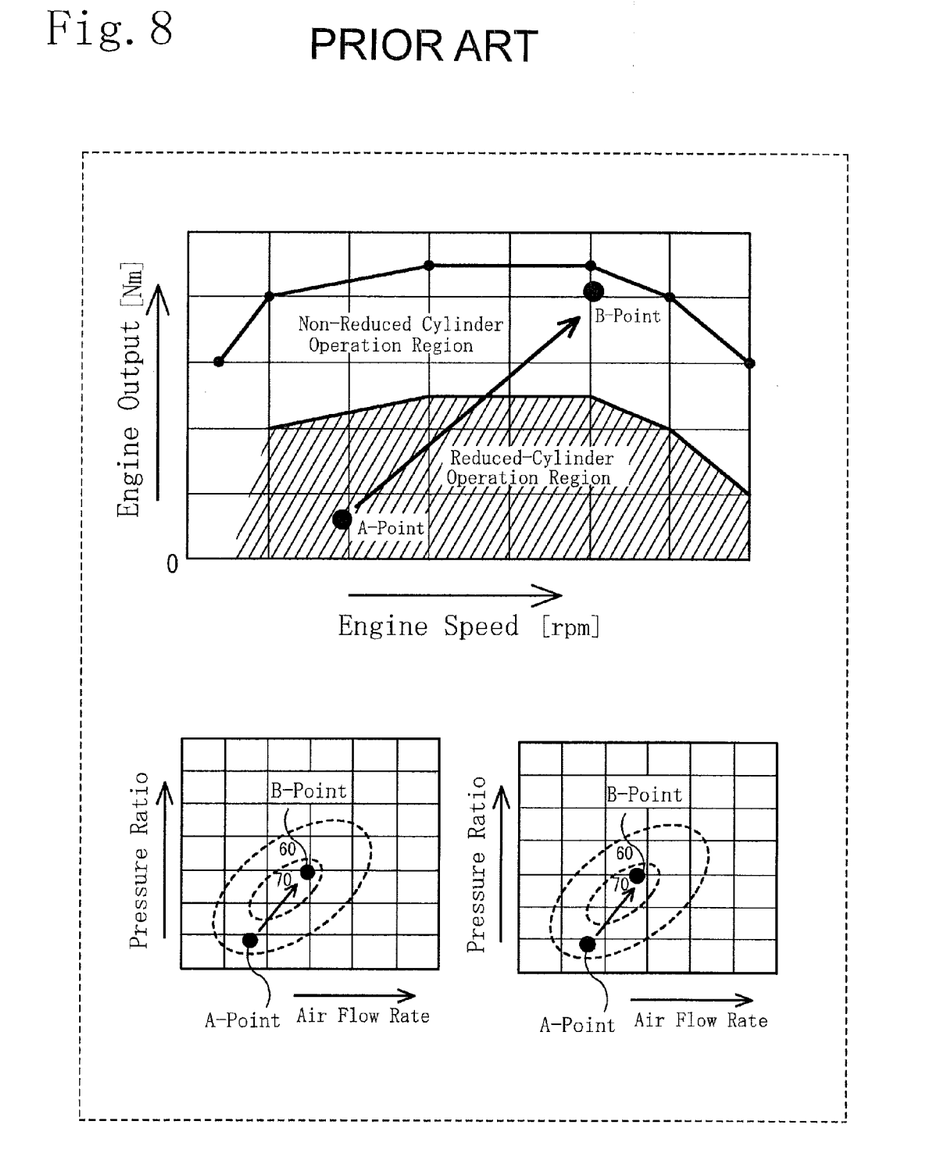
FIG. 8 is a diagram illustrating a graph of "engine speed and engine output" and a graph of "compressor map (air flow rate and pressure ratio)" on the basis of an image of a system of an engine performing a prior-art reduced-cylinder operation and two units of small-sized turbochargers.

FIG. 7 illustrates a graph of "engine speed and engine output" and a graph of "compressor map (air flow rate and pressure ratio)" created on the basis of an image of a system of a single-stage supercharging type normal engine. Moreover, FIG. 8 illustrates a graph of "engine speed and engine output" and a graph of "compressor map (air flow rate and pressure ratio)" created on the basis of an image of a system of an engine and two units of small-sized turbochargers performing the reduced-cylinder operation of Patent Document 2.

In the case of this Patent Document 2, when a small-sized turbocharger for a reduced cylinder is used, compressor efficiency (illustrated by a contour ellipse indicated by reference numerals 60, 70 and the like) rises to some degree in a region where a load is low as indicated by an A-point, for example, and supercharging efficiency can be improved. However, in a region where a load is high as illustrated by a B-point exceeding a reduced-cylinder operation region, it falls lower than that of the normal engine in FIG. 7 to the contrary.

Of course, regarding a turbocharger, a region to be used can be changed depending on a selection of specification or on matching, but as described above, since a region with a good efficiency which is a merit of employment of a small-sized turbocharger is small, and since the efficiency of the small-sized turbocharger is lower than that of the large-sized turbocharger, the efficiency cannot be improved in a region where a load is high. Thus, its employment is difficult since fuel efficiency becomes poor in a region with a high load which is frequently used in commercial vehicles and the like.

In order to solve the above described problems, a system of "reduced cylinder+plurality of small-sized turbochargers +low-pressure stage large-sized turbocharger" can be considered. However, in order to realize this system, it is important to solve a problem which is a hindrance in obtaining improved engine performance, that is, one of the small-sized turbochargers which is operating during a reduced-cylinder operation cannot circulate and pressurize charged air to the other small-sized turbocharger which is stopped during the reduced-cylinder operation.

As improvement for this problem, as described in Japanese patent application Kokai publication No. 2011-231683 (Patent Document 3), for example, an internal combustion engine is proposed. The engine is provided with a two-stage supercharging system, in which a high-pressure stage turbocharger is arranged in each of a plurality of exhaust passages, and an exhaust gas flowing out of these high-pressure stage turbochargers is introduced into a low-pressure stage turbocharger, and a three-way valve is attached at a portion where intake passages from the both high-pressure stage turbochargers merge.

However, this internal combustion engine has two the problems of a structure of the three-way valve and deterioration of turbo durability caused by a mounting position.

Regarding the problem of the structure of the three-way valve, there is no detailed description on the three-way valve used in the above internal combustion engine, and it is presumed from FIG. 1 in Patent Document 3 that the three-way valve has a mechanism to be automatically opened/closed by a negative pressure, but an engine intake side (intercooler) of this three-way valve requires an opening area larger than a total area of the respective areas of the high-pressure stage turbochargers, and if the area is smaller than that, a pressure loss occurs during an engine full-load operation, and a problem of deterioration of engine performance is caused. If such large opening area is to be ensured, the size of the three-way valve increases, and the system becomes extremely large and impractical.

In FIG. 1 of Patent Document 3, the valve of the three-way valve is half-open, but the opening area of this valve portion is extremely small. In this three-way valve, by means of a pressure difference generated during a return from the reduced-cylinder operation to a base full-cylinder operation or during the respective engine combustions or turbo performances are varied, an action to close the valve of the three-way valve to one side works, and as a result, an engine pumping loss deteriorates due to a rise of an exhaust pressure in the engine cylinder of a group with a small pressure, and thus, the engine performance such as exhaust gas performance, fuel efficiency performance and the like deteriorate. Thus, the performance of the system cannot be improved.

Regarding the problem of deterioration of turbo durability caused by a mounting position, the mounting spot of the three-way valve being at an outlet of the high-pressure stage turbocharger is the problem. That is, assuming that, while each of the high-pressure stage turbochargers is operating close to the maximum rotation during an engine operation at a full load, the operation suddenly enters the reduced-cylinder operation region,-a fuel is stopped to one of the cylinder groups, and the intake/exhaust valves are also stopped at the same time, while the other cylinder group performs the reduced-cylinder operation, but since the exhaust gas energy obtained by the high-pressure stage turbocharger on this reduced-cylinder operation side decreases, a pressure of the compressed air decreases, whereby the three-way valve is rapidly closed.

Figure 9:
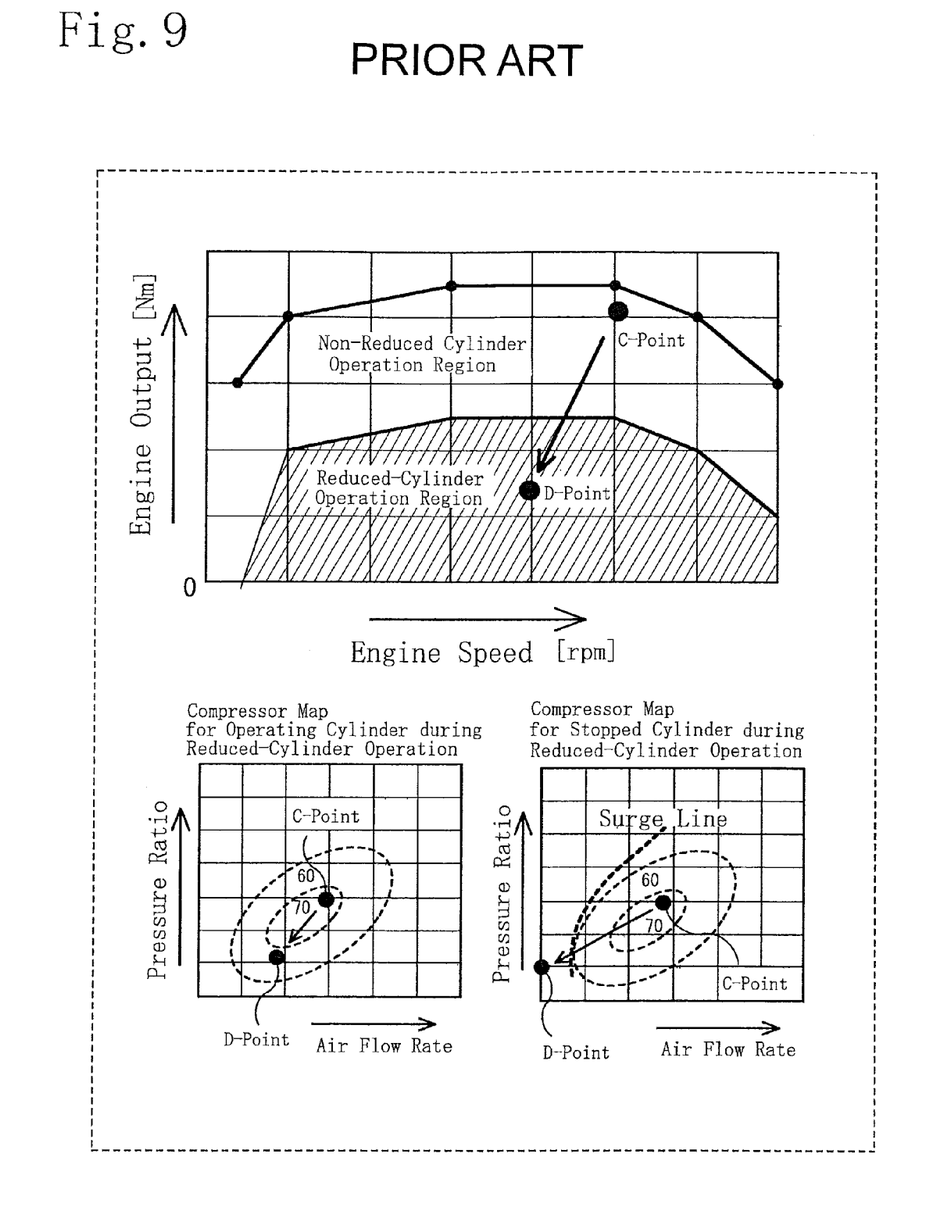
FIG. 9 is a diagram illustrating a graph of "engine speed and engine output" and a graph of "compressor map (air flow

However, since the high-pressure stage turbocharger is still rotating at a high speed at this time, a state in which a flow rate is not gained even though supercharging is performed occurs. By plotting this state on a compressor map illustrated in FIG. 9, the pressure ratio is extremely high, while the flow rate is close to zero. That is, in transition from a C-point to a D-point in FIG. 9, as illustrated in the compressor map of the turbocharger of a cylinder stopped during the reduced cylinder operation, the high-pressure stage turbocharger for a stopped cylinder has its outlet rapidly closed by the pressure difference, and the air flow rate falls to zero. However, since this high-pressure stage turbocharger is still rotating, the state exceeds a surge line without fail at the moment when the outlet is closed. Thus, the turbocharger would be broken unless a special measure is taken.

Therefore, the above system of "reduced cylinder+plurality of small-sized turbochargers +low-pressure stage large-sized turbocharger" provided with the three-way valve does not fundamentally or essentially improve the problems in obtaining-a fuel efficiency improvement effect, and mass production is difficult.

That is, as described above, when a supercharging system having one or a plurality of turbochargers in a diesel engine of an internal combustion engine is combined with a reduced-cylinder operation system having a valve stopping mechanism, a problem occurs that an engine exhaust gas of the engine performance deteriorates due to a lowered supercharging amount, and moreover, an effect of improvement of engine fuel efficiency which is a target cannot be sufficiently obtained. Specifically, a state becomes only a light-load operation state in which a region where fuel efficiency improvement can be extremely small. On the other hand, mass production has been already realized in the gasoline engine, and the effect of fuel efficiency improvement that can be obtained by lowered engine pumping realized by introduction of the reduced-cylinder operation system is obvious, but an influence of the above described problems is great in the diesel engine in which an air excess ratio is important.

PRIOR ART DOCUMENT

Patent Documents

Patent Document 1: Japanese patent application Kokai publication No. 2010-223040
Patent Document 2: Japanese patent application Kokai publication No. 2006-177191
Patent Document 3: Japanese patent application Kokai publication No. 2011-231683

SUMMARY OF THE INVENTION

The present invention was made in view of the above described circumstances and has an object to provide a diesel engine which is provided with a plurality of small-sized high-pressure stage turbochargers optimized for each of intake systems of a cylinder group for reduced cylinders and a cylinder group continuing an operation and moreover, a large-sized low-pressure stage turbochargers not deteriorating an engine-base full-load performance, and which is capable of improving turbo-charging circulation between the small-sized high-pressure stage turbochargers during a reduced-cylinder operation, of sufficiently obtaining an effect of the reduced-cylinder operation of a diesel engine, and of obtaining an effect of engine performance improvement such as fuel efficiency and the like.

That is, a diesel engine which can supply a sufficient air amount into an operating cylinder by preventing a drop of a supercharging amount during the reduced-cylinder operation, and which can prevent the both of the deterioration of combustion in the operating cylinder and the deterioration of a state of an exhaust gas which can easily occur during the reduced-cylinder operation, and which can sufficiently obtain the effect of fuel efficiency improvement, is provided.

In order to achieve the above described object, the diesel engine of the present invention is configured such that, in a diesel engine provided with turbochargers and a valve stopping mechanism for reduced cylinders configured to stop opening/closing of exhaust valves and intake valves of a cylinder group set in advance, cylinders are sorted into a first cylinder group which continues or stops an operation by the valve stopping mechanism for reduced cylinders and a second cylinder group which stops or continues the operation by the valve stopping mechanism for reduced cylinders, an intake passage is made to branch to a first intake passage to the first cylinder group and a second intake passage to the second cylinder group, an exhaust passage is made to branch to a first exhaust passage from the first cylinder group and a second exhaust passage from the second cylinder group, a first turbocharger is provided in the first intake passage and in the first exhaust passage, while a second turbocharger is provided in the second intake passage and in the second exhaust passage, respectively, and a third turbocharger is provided in an intake passage on an upstream side of a branching portion of the first intake passage and the second intake passage and in an exhaust passage on a downstream side of a merging portion of the first exhaust passage and the second exhaust passage, the first intake passage and the second intake passage are not merged with each other, but the first intake passage is connected to a first intake manifold of the first cylinder group, and the second intake passage is connected to a second intake manifold of the second cylinder group.

According to this configuration, by means of the reduced cylinder operation system, the intake/exhaust valves of the engine are stopped, pumping friction of the engine is reduced, and fuel efficiency can be improved. This reduced-cylinder operation system stops the intake/exhaust valves of the engine in accordance with an engine load and stops some of the cylinders and thus, the intake/exhaust pumping loss of the engine is reduced, a fuel injection amount of the operating cylinder increases and the load increases, an average effective pressure (PME) of the operating cylinder increases, and heat efficiency rises due to lowered heat loss, and as a result, fuel efficiency of the engine is improved.

Moreover, according to this configuration, a turbocharger optimized for an exhaust gas flow rate of the cylinder operating during the reduced-cylinder operation can be selected, and a turbocharger optimized for the reduced-cylinder operation system can be arranged. As a result, the turbocharger operates on an extremely efficient operation line and can contribute to improvement of fuel efficiency of the engine. At the same time, since a large quantity of turbo-charging can be supercharged into the operating cylinders, the operating cylinders can achieve high combustion efficiency, and engine fuel efficiency of the engine performances can be improved in the end.

In other words, such a state due to the reduced-cylinder operation can be prevented in which an exhaust gas flow rate drastically decreases, the operation point of the turbocharger shifts, and as a result, the turbocharger can no longer work sufficiently, the supercharging amount of the engine drops, combustion of the engine deteriorates, fuel efficiency deteriorates, and comprehensive fuel efficiency performances deteriorate. That is, even in the reduced-cylinder operation, the turbocharger is allowed to work sufficiently while keeping the turbo operating point favorable, the supercharging amount of the engine is maintained, combustion of the engine is kept favorable, and deterioration of fuel efficiency can be suppressed.

Moreover, since the first intake passage is connected to the first intake manifold of the first cylinder group and the second intake passage is connected to the second intake manifold of the second cylinder group without merging the first intake passage and the second intake passage with each other, a merging point and a three-way valve to be provided at this merging point are no longer needed and thus, an entire system can be made compact and moreover, an entry into surge line of a turbo caused by provision of the three-way valve can be prevented.

In the above described diesel engine, it is configured such that, a controller configured to control the valve stopping mechanism for reduced cylinders, the first turbocharger, the second turbocharger, and the third turbocharger in accordance with an engine speed and an engine load during a normal operation, is provided, and during an idling operation, during a deceleration operation, and when a flow rate of the total fuel to be supplied to the cylinders is zero, the controller executes control so that deactivation of the cylinder group having stopped the operation is stopped and all the cylinders are operated, even during the reduced-cylinder operation in which the valve stopping mechanism for reduced cylinders is operated.

According to this configuration, during the normal operation, since the valve stopping mechanism for reduced cylinders is controlled by a basic map or feedback control in accordance with the engine speed, the engine load (or a fuel amount or an engine output), an operation of the diesel engine can be optimized. Moreover, during the idling operation, all the cylinders are operated so that vibration of the engine can be reduced, and during the reduced operation or if the fuel amount is zero, all the cylinders are operated so as to ensure a normal engine braking force, and a drop of the engine braking force which is a problem caused by employment of the reduced-cylinder operation system can be prevented.

According to the diesel engine according to the present invention, a plurality of small-sized high-pressure stage turbochargers optimized for the respective intake systems of the cylinder group for reduced cylinders and the cylinder group continuing operation as well as a large-sized low-pressure stage turbocharger which does not deteriorate engine-base full-load performance are provided, supercharging circulation between the small-sized high-pressure stage turbochargers can be improved during the reduced-cylinder operation, an effect of the reduced-cylinder operation can be sufficiently obtained in the diesel engine, and an effect of the engine performance improvement such as fuel efficiency and the like can be obtained.

That is, a sufficient air amount can be supplied into the operating cylinders by preventing lowered supercharging amount during the reduced-cylinder operation, deterioration of combustion in the operating cylinders and deterioration of a state of an exhaust gas which can easily occur during the reduced-cylinder operation can be prevented, and the effect of fuel efficiency improvement can be sufficiently obtained.

Moreover, since the first intake passage is connected to the first intake manifold of the first cylinder group and the second intake passage is connected to the second intake manifold of the second cylinder group without merging the first intake passage and the second intake passage, a merging point and a three-way valve to be provided at this merging point are no longer needed and thus, the entire system can be made compact and moreover, an entry into surge line of a turbo caused by provision of the three-way valve can be prevented.

DETAILED DESCRIPTION

A diesel engine and an operating method of the engine of embodiments according to the present invention will be described below by referring to the attached drawings. Here, a case in which an internal combustion engine is a diesel engine mounted on a vehicle is described, but the present invention can be applied not only to the diesel engine mounted on a vehicle but also to diesel engines in general for industries or power generation.

Figure 1:
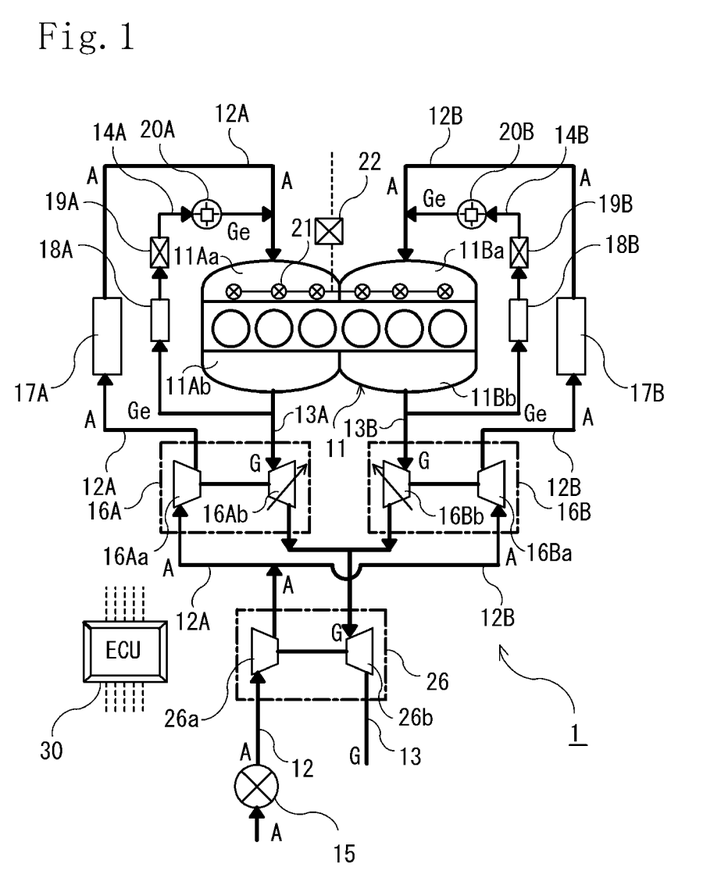
FIG. 1 is diagram illustrating a configuration of a diesel engine of an embodiment of the present invention.
Figure 2:
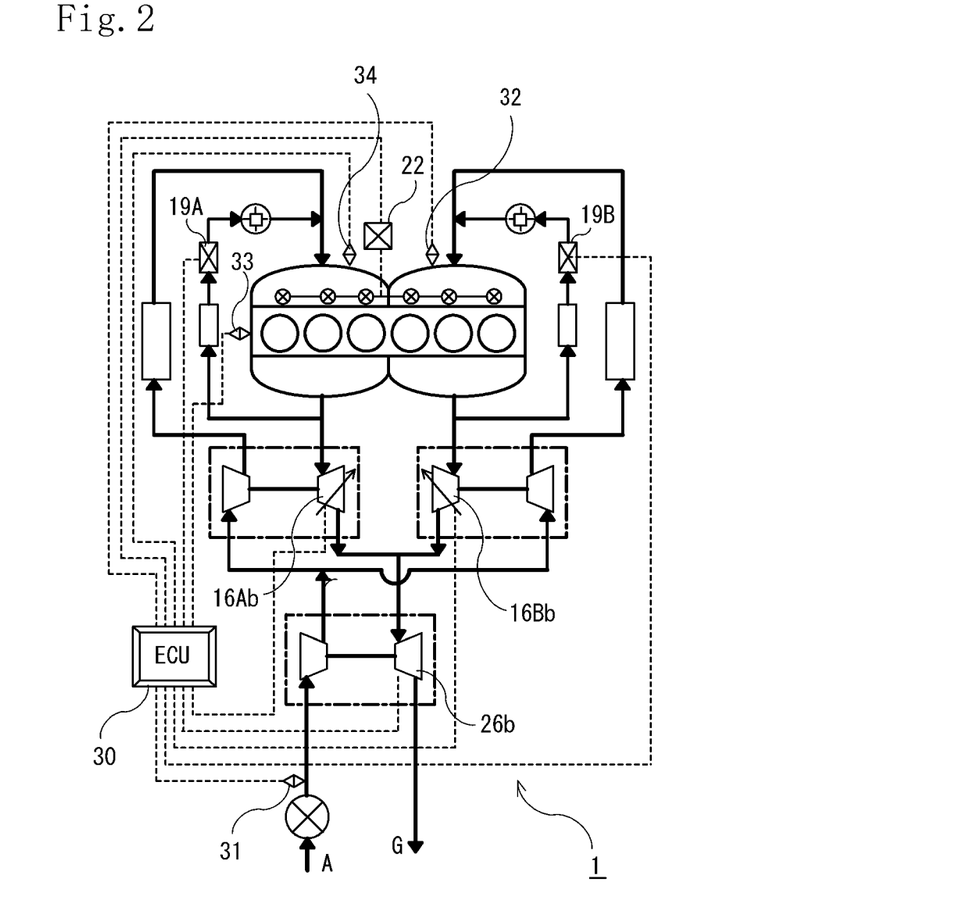
FIG. 2 is a diagram illustrating a configuration of a control system of the diesel engine in FIG. 1.

A diesel engine (hereinafter referred to as an engine) of the embodiment according to the present invention illustrated in FIGS. 1 and 2 is configured separately by a first cylinder group continuing (or stopping) an operation by a valve stopping mechanism 21 for reduced cylinders and a second cylinder group stopping (or continuing) the operation by the valve stopping mechanism 21 for reduced cylinders. In an engine main body 11, an intake manifold is formed by a first intake manifold 11Aa for the first cylinder group and a second intake manifold 11Ba for the second cylinder group, and an exhaust manifold is also formed by a first exhaust manifold 11Ab for the first cylinder group and a second exhaust manifold 11Bb for the second cylinder group.

Moreover, an intake passage 12 is made to branch into a first intake passage 12A for the first cylinder group and a second intake passage 12B for the second cylinder group on a downstream side of an air cleaner 15 and a low-pressure stage compressor 26a of a low-pressure stage turbocharger 26, and an exhaust passage 13 is made to branch into a first exhaust passage 13A from the first cylinder group and a second exhaust passage 13B from the second cylinder group and they are merged into the exhaust passage 13 on an upstream of a low-pressure stage turbine 26b of the low-pressure stage turbocharger 26.

By this configuration, the low-pressure stage turbocharger 26 which becomes a third turbocharger is arranged in the intake passage 12 which is on the upstream side of a branching portion of the first intake passage 12A and the second intake passage 12B and in the exhaust passage 13 which is on the downstream side of a merging portion of the first exhaust passage 13A and the second exhaust passage 13B. By this configuration, engine turbo-charging performance is improved.

At the same time, a first turbocharger 16A is provided in the first intake passage 12A and the first exhaust passage 13A, and a second turbocharger 16B is provided in the second intake passage 12B and the second exhaust passage 13B, respectively. That is, a first compressor 16Aa of the first turbocharger 16A is provided in the first intake passage 12A, and a first turbine 16Ab of the first turbocharger 16A is provided in the first exhaust passage 13A, while a second compressor 16Ba of the second turbocharger 16B is provided in the second intake passage 12B and a second turbine 16Bb of the second turbocharger 16B is provided in the second exhaust passage 13B.

By this configuration, a two-stage type turbo-charging system is formed of the first turbocharger 16A and the low-pressure stage turbocharger 26 or of the second turbocharger 16B and the low-pressure stage turbocharger 26. For the first and second turbochargers 16A and 16B, a variable-geometry turbocharger ("VGT") having a variable blade in the turbines 16Ab and 16Bb is preferably employed.

Moreover, on the downstream side of the first compressor 16Aa of the first turbocharger 16A in the first intake passage 12A, a first intercooler 17A is provided, and on the downstream side of the second compressor 16Ba of the second turbocharger 16B in the second intake passage 12B, a second intercooler 17B is provided, respectively.

Furthermore, without merging the first intake passage 12A on the downstream side of the first intercooler 17A and the second intake passage 12B on the downstream side of the second intercooler 17B, the first intake passage 12A is connected to the first intake manifold 11Aa of the first cylinder group, and the second intake passage 12B is connected to the second intake manifold 11Ba of the second cylinder group in configuration.

Moreover, a first EGR passage 14A connecting the first exhaust passage 13A and the first intake passage 12A, and a second EGR passage 14B connecting the second exhaust passage 13B and the second intake passage 12B are provided, respectively, and in the first EGR passage 14A, a first EGR cooler 18A, a first EGR valve 19A, and a first EGR check valve 20A are provided, while in the second EGR passage 14B, a second EGR cooler 18B, a second EGR valve 19B, and a second EGR check valve 20B are provided, respectively.

Moreover, in order to enable a reduced-cylinder operation, in the engine main body 11, the valve stopping mechanism 21 for reduced cylinders operated by a hydraulic pressure, for example, is provided in each of the cylinders of the engine 1, and moreover, in order to operate this valve stopping mechanism 21 for reduced cylinders, a hydraulic electromagnetic valve 22 for reduced-cylinder control is provided. By this valve stopping mechanism 21 for reduced cylinders, an opening/closing valve operation of the intake/exhaust valves (not shown) of the engine 1 is stopped, and some of the cylinders of the engine 1 can be arbitrarily stopped in the configuration. That is, a reduced-cylinder operation system is provided in the configuration.

Figure 5:
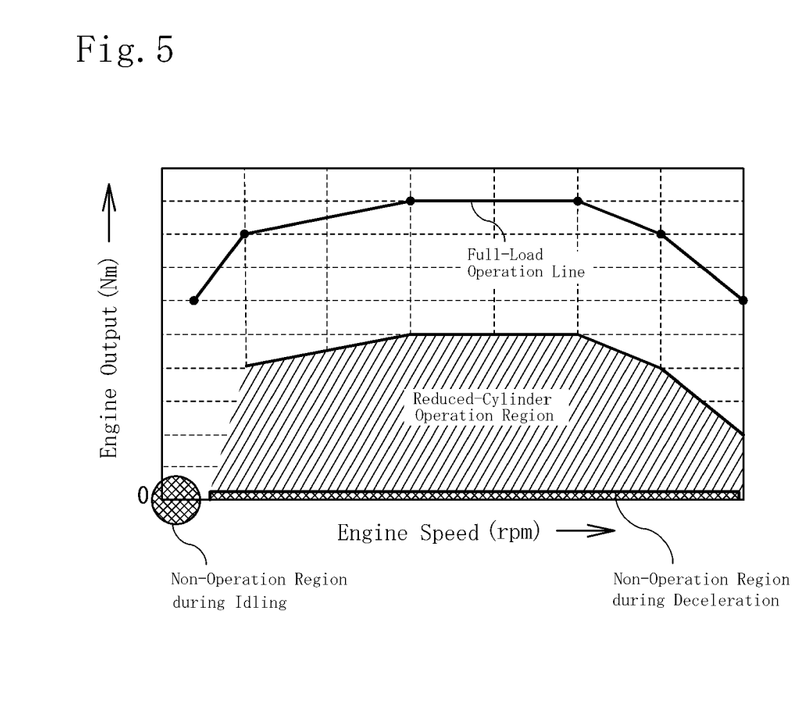
FIG. 5 is a graph illustrating an example of a full-cylinder operation region, a reduced-cylinder operation region, and a non-operating region of a reduced-cylinder operation using an engine speed and an engine output as parameters.

In this reduced-cylinder operation system, in accordance with an operation state (engine speed, an engine load (or a fuel injection amount or an engine output)) of the engine 1, the opening/closing operation of the intake/exhaust valves is stopped, and some of the cylinders selected in advance are stopped. Regarding this reduced cylinder, base cylinders (operating cylinders) and stopped cylinders (reduced cylinders) can be set in various cases depending on the engine to be set, and FIG. 5 illustrates an engine output (torque) diagram when three cylinders are stopped for an engine full-load line of six cylinders as a reference example. By stopping the three cylinders, a fuel flow rate injected into the remaining operating cylinders is approximately doubled.

Therefore, when being indicated in the reference example in FIG. 5, it is an engine output (torque) curve of the three-cylinder reduced output line which is approximately a half of a normal full-load line. However, the number of cylinders to be reduced and an output required in the engine can be varied depending on a vehicle traveling state. Thus, engine performance, engine vibration and the like are measured in an engine test bench in advance so as to evaluate and complete an optimal engine control map, and a "reduced-cylinder operating region by a basic map" should be determined.

By this reduced-cylinder operation, a pumping loss of intake/exhaust of the engine 1 is reduced and at the same time, a fuel injection amount of the operating cylinder increases and a load increases, whereby the average effective pressure (PME) of the operating cylinder increases, heat efficiency rises due to lowered heat loss, and as a result, fuel efficiency of the engine 1 can be improved.

Then, a controller 30 called an ECU (Engine Control Unit) configured to control an operation in general of the engine 1 is provided. This controller 30 receives inputs of data of measured values of sensors such as an intake amount sensor (MAF sensor) 31 for measuring a flow rate of an intake air A of the engine 1, a boost pressure sensor 32 for measuring an engine intake pressure, an engine speed sensor 33 for measuring an engine speed, a fuel injection nozzle 34 provided with a function of measuring an actual injection amount for feedback control of the fuel and the like and outputs control signals for controlling the intake/exhaust valves (not shown) of the engine 1, the first turbine 16Ab of the first turbocharger 16A, the second turbine 16Bb of the second turbocharger 16B, the low-pressure stage turbine 26b of the low-pressure stage turbocharger 26, the first EGR valve 19A, the second EGR valve 19B, the fuel injection valve (not shown), the valve stopping mechanism 21 for reduced cylinders and the like.

That is, this engine 1 has various basic engine maps with an engine speed (rpm) for a lateral axis and a fuel injection amount (mm$^3$/st) for a vertical axis, for example, on the basis of data measured by the many sensors 31 to 34, and by comparing detected values of each of these sensors 31 to 34 during the engine operation with the basic engine map (such as a boost pressure map in FIG. 6 and the like, for example), by calculating various control amounts obtained from the basic engine map, and by operating each actuator provided in the engine 1 on the basis of the control amounts, control is executed so as to have an optimal engine state by controlling EGR, turbo VGT, injection timing and the like, for example.

Subsequently, the operating method in the engine 1 with the above described configuration will be described. The controller 30 of this engine 1 controls the hydraulic electromagnetic valve 22 for reduced-cylinder control operating the operation of the valve stopping mechanism 21 for reduced cylinders in accordance with the engine speed and the engine load in a normal operation, and during the idling operation, during the deceleration operation, and when the flow rate of the total fuel to be supplied to the cylinders is zero, the controller executes control so that the deactivation of the cylinder group having stopped the operation is stopped and all the cylinders are operated even during the reduced-cylinder operation in which the valve stopping mechanism 21 for reduced cylinders is operated.

Figure 3:
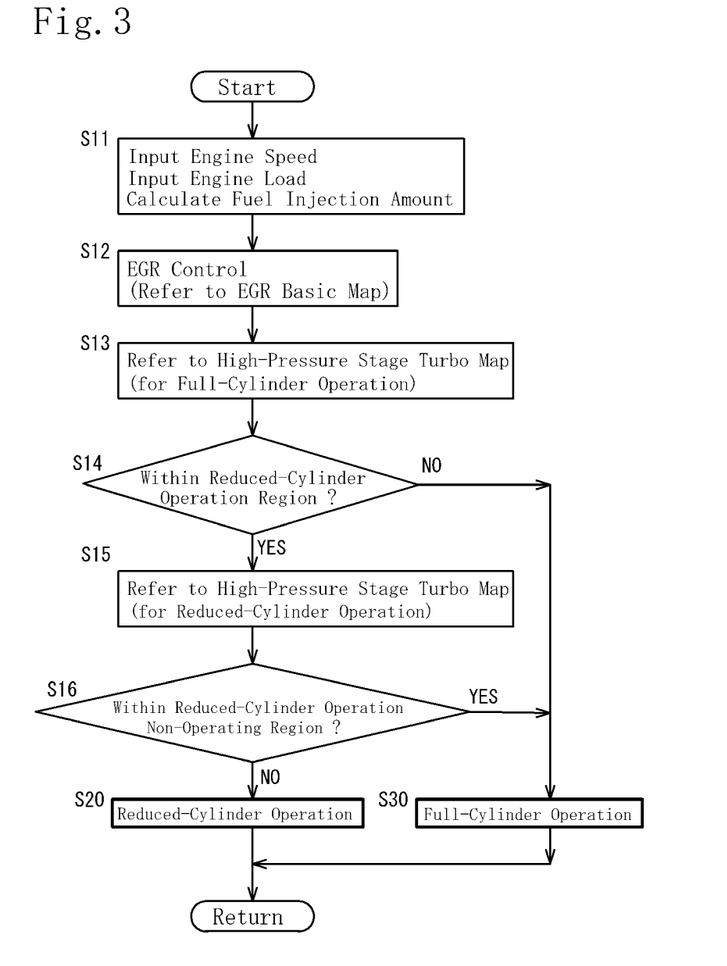
FIG. 3 is a flowchart illustrating an example of a control flow for a turbo-charging system and a reduced-cylinder operating system.

This control can be realized by control according to a control flow as illustrated in FIG. 3. When the operation of the engine 1 is started, this control flow in FIG. 3 is also started by being called up by a superior control flow, and at Step S11, an input of an engine speed measured by the engine speed sensor 33, an input of an engine load detected by an accelerator sensor (not shown) and the like, and calculation of a fuel injection amount are executed. The calculation of the fuel injection amount may be substituted by a fuel injection amount measured by the fuel injection nozzle 34 provided with the function of measuring an actual injection amount. At the subsequent Step S12, in order to execute the EGR control, a control signal for controlling the EGR valves 19A and 19B is outputted by referring to an EGR basic map.

Then, at Step S13, regarding turbo-charging, a region corresponding to an engine operation state of this engine speed and engine output (or a load or a fuel injection amount) is acquired by referring to a high-pressure stage turbo map (FIG. 5, for example) for full-cylinder operation, and at Step S14, it is determined whether or not this region is within a reduced-cylinder operation region.

In the determination at Step S14, if it is not within the reduced-cylinder operation region (NO), the routine proceeds to Step S30, and the full-cylinder operation is performed for a predetermined period of time set in advance (time relating to an interval of determination at Step S14 or Step S16) without operating the valve-stopping mechanism 21 for reduced cylinders. That is, if the current operation state is a full-cylinder operation, the operation is continued as it is, while if the current operation state is a reduced-cylinder operation in which the valve stopping mechanism 21 for reduced cylinders is operated, deactivation of the cylinder group having stopped the operation is stopped, and all the cylinders are operated.

Moreover, in the determination at Step S14, if it is within the reduced-cylinder operation region (YES), the routine proceeds to Step S15, a region corresponding to an engine operation state of this engine speed and the engine output (or a load or a fuel injection amount) is acquired by referring to the high-pressure stage turbo map (lower side in FIG. 5, for example) for the reduced-cylinder operation, and it is determined at Step S16 whether or not this region is within a reduced-cylinder operation non-operating region, that is, within a non-operating region during idling, within a non-operating region during deceleration or within a region in which the fuel injection amount is zero.

In the determination at Step S16, if it is within the reduced-cylinder operation non-operating region (YES), the routine proceeds to Step S30, and the full-cylinder operation is performed. That is, if the current operation state is the full-cylinder operation, the operation is continued as it is, while if the current operation state is during the reduced-cylinder operation in which the valve stopping mechanism 21 for reduced cylinders is operated, deactivation of the stopped cylinder group even in that case is stopped, and all the cylinders are operated.

In the determination at Step S16, if it is not within the reduced-cylinder operation non-operating region (NO), the routine proceeds to Step S20, and the reduced-cylinder operation is performed for a predetermined period of time set in advance (time relating to an interval of determination at Step S14 or Step S16). That is, if the current operation state is the reduced-cylinder operation, the operation is continued as it is, while if the current operation state is the full-cylinder operation, the valve stopping mechanism 21 for reduced cylinders is operated, one of the cylinder groups is stopped, and the reduced-cylinder operation is performed.

Then, when the predetermined period of time set in advance has elapsed since the reduced-cylinder operation at Step S20 or the full-cylinder operation at Step S30 was performed, the routine goes to return and returns to the superior control flow, and the control flow in FIG. 3 is called up again by this superior control flow, and the control flow in FIG. 3 is repeatedly executed until the operation of the engine 1 is stopped. If a signal of operation stop of the engine 1 is received, the routine returns to the superior control flow even in the middle of the control flow in FIG. 3, and the control flow in FIG. 3 is also finished with the superior control flow.

In FIG. 5, the non-operating region during idling is illustrated in the vicinity of lower left "0 (zero)". Employment of idling stop for fuel cost reduction is found in many cases recently, but in the present invention, it is not set as the reduced-cylinder operation region since it has much vibration.

Moreover, the non-operating region during deceleration is illustrated in the vicinity of an output "0 (zero)" on a lower stage in FIG. 5. Regarding a drop of an engine braking force assisting a brake, which is often concern in the reduced-cylinder operation system, an engine deceleration state is grasped by measurement of a fuel injection amount attached to the engine 1 in the present invention so that the engine 1 is switched from the reduced-cylinder operation state to the full-cylinder operation state.

Subsequently, turbo-charging in the reduced-cylinder operation, that is, operation control of the first turbocharger 16A (or the second turbocharger 16B) on the first cylinder group (or the second cylinder group) side operating during the reduced-cylinder operation will be described.

Figure 4:
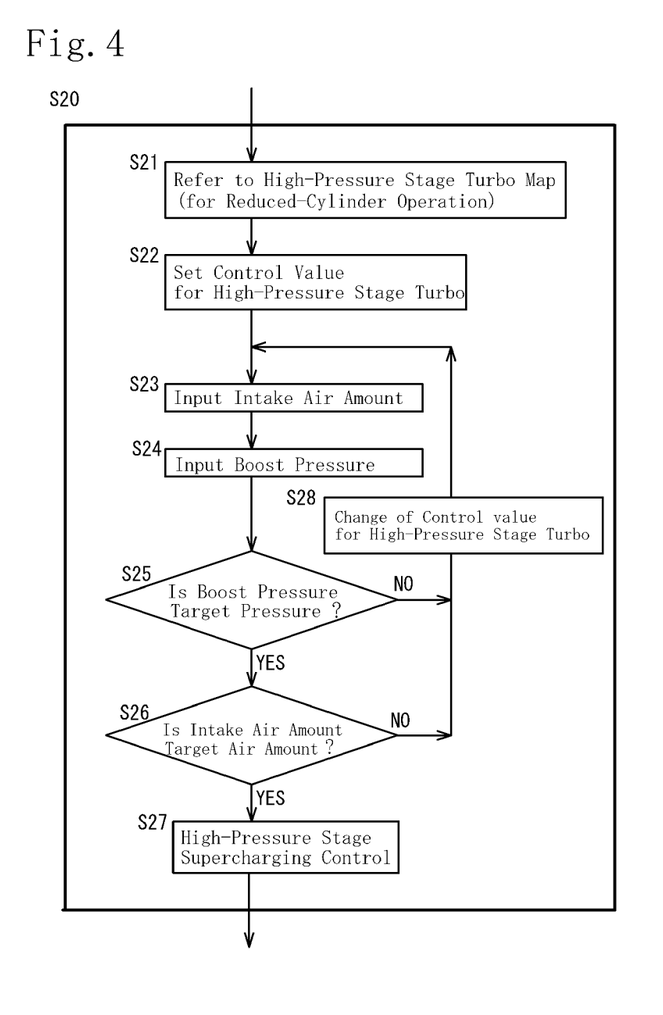
FIG. 4 is a flowchart illustrating an example of the detailed control flow of the reduced-cylinder operation in FIG. 3.

As illustrated in a control flow in FIG. 4, regarding turbo-charging control during the reduced-cylinder operation, in the control of the high-pressure stage turbocharger (high-pressure stage turbo), the high-pressure stage turbo map for the reduced-cylinder operation is referred to at Step S21, and a control value of the high-pressure stage turbo corresponding to the engine speed and the engine load is set at Step S22. Subsequently, at Step S23, an intake air amount measured by the intake amount sensor 31 is inputted, and a boost pressure measured by the boost pressure sensor 32 is inputted at Step S24.

Then, it is determined whether or not the boost pressure inputted at Step S25 is a target pressure calculated from the basic map for turbo-charging, and if it is not (NO), the control value for the high-pressure state turbo is changed at Step S28, and the routine returns to Step S23. If the boost pressure inputted in the determination at Step S25 is the target pressure (YES), the routine proceeds to Step S26.

Then, it is determined at Step S26 whether or not the intake air amount inputted at Step S23 is a target air amount calculated from the basic map for supercharging or engine operation, and if it is not (NO), the control value for the high-pressure stage turbo is changed at Step S28, and the routine returns to Step S23. If the intake air amount inputted in the determination at Step S26 is the target air amount (YES), the routine proceeds to Step S27, and high-pressure stage turbo-charging control is executed.

Figure 6:
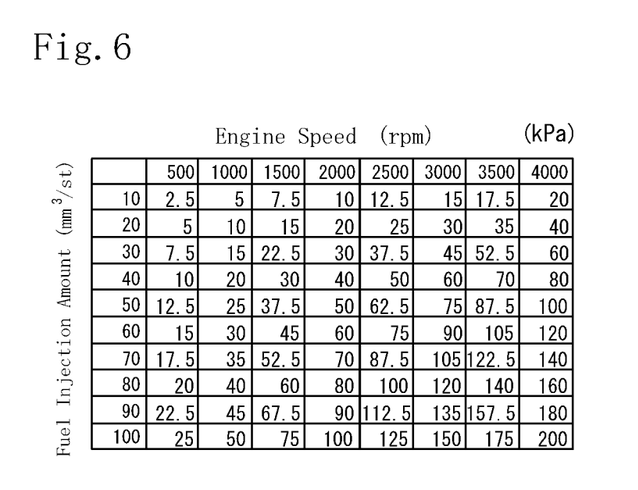
FIG. 6 is a table illustrating an example of a basic map of a boost pressure using the engine speed and a fuel amount as parameters.

An example of the basic map used for these controls is illustrated in FIG. 6. The lateral axis shows the engine speed, the vertical axis shows the fuel injection amount measured by the fuel injection nozzle 34 with a fuel injection sensor and the like, and values in the center are target boost pressures (kPa) at that time. In order to achieve targets of a low exhaust gas amount and a low fuel cost, optimal calibration is performed in states of each engine speed and each engine output in a prior engine test bench. Control can be indefinite and specifically includes controls of an EGR valve opening degree, a turbo variable blade, engine injection timing and the like. In addition to them, the basic map or feedback control is executed also in the reduced-cylinder operation system.

In these turbo-charging controls, the turbochargers 16A and 16B provided with a variable blade (VGT) are controlled, and the variable blade is controlled in accordance with the operation state of the engine 1. In the present invention, this turbo-charging control is also interlocked with the reduced-cylinder operation system and optimized. Therefore, in this control of the variable blade, the basic map is provided for the operation during the normal operation (full-cylinder operation) and the operation during the reduced-cylinder operation, respectively.

Moreover, use of the EGR to a high EGR rate has been practiced in the recent engines in order to conform to the strict exhaust gas regulation, and the supercharging amount is drastically reduced by this high EGR rate and thus, this EGR map control is involved in a complicated manner. In order to achieve the targets of low exhaust gas amount and low fuel cost, optical calibration is performed in states of each engine speed and each engine output in a prior engine test bench. Control can be indefinite and specifically includes controls of an EGR valve opening degree, a turbo variable blade, engine injection timing and the like. In addition to them, the basic map or feedback control is executed also in the supercharging system when the reduced-cylinder operation system is in operation in order to optimize the engine.

In this engine 1, in order to achieve efficient reduction of NOx contained in an exhaust gas G of the engine 1 and improvement of an engine fuel efficiency at the same time, a high-pressure EGR system and the intake amount sensor 31 are arranged and the feedback control is performed for the measured values of the intake amounts. If the intake amount (engine air amount) measured during a transition operation of the engine 1 and the measured boost pressure run short of target values calculated from the respective engine basic target maps, the variable blade attached to the turbocharger 16A (or 16B) is reduced so as to ensure the intake amount, and if the intake amount or the boost pressure still runs short, the EGR valve opening degree is reduced so as to prevent deterioration of the engine performance.

Then, since this engine 1 is configured so that two-stage supercharging can be performed, the high-pressure stage first turbocharger 16A (or the second turbocharger 16B) and the low-pressure stage third turbocharger are selected in accordance with the operating state of the engine 1, and both the high-pressure stage first turbocharger 16A (or the second turbocharger 16B) and the low-pressure stage third turbocharger are controlled or only the low-pressure stage third turbocharger is controlled, in accordance with the state. In FIGS. 1 and 2, a passage bypassing the first turbocharger 16A and the second turbocharger 16B is not illustrated for simplification of the figures.

According to this operating method, by the reduced-cylinder operation system, fuel efficiency can be improved by stopping the intake/exhaust valves of the engine 1 and by reducing pumping friction of the engine 1. Since this reduced-cylinder operation system stops the intake/exhaust valves of the engine 1 and stops some of the cylinders in accordance with the engine load, the intake/exhaust pumping loss of the engine 1 is reduced, the fuel injection amount of the operating cylinder increases and the load increases, the average effective pressure (PME) of the operating cylinder increases, and heat efficiency rises due to a lowered heat loss, and as a result, the fuel efficiency of the engine 1 can be improved.

In more detail, the heat loss is lowered and the fuel efficiency is improved not by the raised engine output and the high PME (average effective pressure) but the fuel efficiency is improved by the following three reasons. First, a ratio of the engine friction to the engine output lowers due to the high PME, whereby machine efficiency is improved, and the engine fuel efficiency is improved. Secondly, the turbo operation enters a region with a high operating point due to the high PME, the turbo efficiency is improved, and the engine fuel efficiency is improved. Thirdly, since an input fuel increases due to the high PME, exhaust energy also increases, the turbo workload increases, and as a result, a charging pressure (boost pressure) increases, and an in-cylinder pressure of the engine increases. As a result, engine combustion efficiency is improved, and engine fuel efficiency is also improved. This is a phenomenon generally described in a text book in which a compression ratio is raised so as to obtain improvement of heat efficiency. That is, the expression that "the heat loss is reduced by the high PME" expresses the first and the last phenomena described above, and actually, the above described process is included.

That is, even if the cylinders in operation are reduced, in order to reliably improve the engine heat efficiency of the operating cylinders which are also a base, an effect by optimization of the turbochargers to be set and the system is required, and the fuel efficiency improvement effect which is a part of the target cannot be obtained even by simply stopping some cylinders and by raising the load of the remaining cylinders. The base of the reduced-cylinder effect is reduction (close to zero) of pumping (IMEP) of the stopped cylinders.

According to the engine 1 with the above configuration, the turbochargers 16A, 16B, and 26 optimized for the exhaust gas flow rate of the operating cylinder during the reduced-cylinder operation can be selected for supercharging, and the turbochargers 16A, 16B and 26 optimized for the reduced-cylinder operation system can be disposed. As a result, the turbochargers 16A, 16B, and 26 can be operated on the extremely efficient operation lines and can be made to contribute to improvement of the engine fuel efficiency. At the same time, a large quantity of supercharging can be performed for the operating cylinders, and thus, high combustion efficiency can be achieved in the operating cylinders, and the fuel efficiency improvement of the engine performances can be realized in the end.

That is, since turbochargers optimal for the reduced cylinders and the operating cylinders are selected, respectively, and the supercharging system is optimized, the supercharging amount of the operating cylinders during the reduced-cylinder operation can be sufficiently ensured, whereby the in-cylinder pressure of the engine can be increased by increasing the supercharging amount of the operating cylinders, and moreover, the fuel of the stopped reduced cylinders is injected into the operating cylinders, the load of the engine cylinders is increased, and the average effective pressure (PME) is increased, and as a result, due to a drop in a heat loss of the engine 1 and a rise of combustion efficiency, fuel use of the engine 1 can be reduced.

Moreover, since the turbo is optimized for the exhaust gas flow rate of the operating cylinders, the attached turbochargers 16A, 16B, and 26 operate in an extremely efficient region on the turbo performance curve, and with a synergic effect of that, an improvement effect of the engine exhaust gas and the engine fuel efficiency can be effectively obtained. Moreover, in the reduced cylinders during the reduced-cylinder operation, by reducing pumping generated in a vertical reciprocating operation of a piston of the cylinder to almost zero by stopping the intake/exhaust valves, engine friction can be drastically reduced, and engine fuel economy can be improved. Therefore, in combination with the fuel efficiency improvement of the operating cylinders during the reduced-cylinder operation, a high engine fuel efficiency improvement effect can be obtained.

In other words, such a state due to the reduced-cylinder operation can be prevented that the exhaust gas flow rate drastically decreases, the operating points of the turbochargers 16A (or 16B) and 26 shift, and as a result, the turbochargers 16A (or 16B) and 26 can no longer work sufficiently, the supercharging amount of the engine 1 drops, combustion of the engine 1 deteriorates, fuel efficiency deteriorates, and the comprehensive fuel efficiency performances deteriorate. That is, even in the reduced-cylinder operation, the turbochargers 16A (or 16B) and 26 sufficiently work while keeping the turbo operating points favorable so that the supercharging amount of the engine 1 is maintained, combustion of the engine 1 is kept favorable, and deterioration of the fuel efficiency can be suppressed.

Moreover, without merging the first intake passage 12A and the second intake passage 12B, the first intake passage 12A is connected to the first intake manifold 11Aa of the first cylinder group and the second intake passage 12B is connected to the second intake manifold 11Ba of the second cylinder group and thus, the merging point and the three-way valve to be provided at this merging point are no longer needed, and thus, the entire system can be made compact, and an entry into surge line of a turbo caused by provision of the three-way valve can be prevented.

In the reduced-cylinder operation, an engine exhaust gas temperature can be raised by reducing the exhaust gas flow rate, by increasing the fuel of the operating cylinders and by raising the load. At present, it is a general practice to attach a post-treatment device for purifying the exhaust gas G of the engine, but its purification rate largely depends on the exhaust gas temperature to be passed through. Moreover, this exhaust gas temperature has been drastically lowered by lowering the fuel use of the engine, and a problem of extremely lowered purification rate of the post-treatment device occurs. In the engine 1 of the present invention, the supercharging amount of the reduced-cylinder engine is improved, but arbitrarily set cylinders are stopped, and by optimally selecting the turbochargers, it is possible to raise the engine exhaust temperature, to improve the post-treatment purification rate, and to reduce the engine exhaust gas.

Moreover, in this engine 1, the turbo-charged compressed air A can be efficiently cooled by the configuration of the first and second intercoolers 17A and 17B. On top of that, since the third turbocharger 26 which becomes a low-pressure stage turbocharger is provided, efficient multi-stage supercharging can be performed.

Moreover, in this operating method of the engine 1, in the operating method of the diesel engine 1 in which supercharging is performed by the turbochargers 16A, 16B, and 26, and the opening/closing of exhaust valves and the intake valves is stopped by the valve stopping mechanism 21 for reduced cylinders in accordance with the operation state of the engine 1, the first turbocharger 16A for supercharging the first cylinder group operated when the valve stopping mechanism 21 for reduced cylinders is operated, the second turbocharger 16B for supercharging the second cylinder group stopping the operation when the valve stopping mechanism 21 for reduced cylinders is operated, and the third turbocharger 26 for supercharging both the first turbocharger 16A and the second turbocharger 16B in accordance with the engine speed and the engine load, are controlled in the normal operation. And, during the idling operation, during the deceleration operation, and when the flow rate of the total fuel to be supplied to the cylinders is zero, deactivation of the second cylinder group which stops operation when the valve stopping mechanism 21 for reduced cylinders is operated is stopped, and all the cylinders are operated.

In the above, it is described that, when the valve stopping mechanism 21 for reduced cylinders is operated, the first cylinder group is operated, and the second cylinder group is stopped, but to the contrary, it may be so configured that the first cylinder group is stopped, and the second cylinder group is operated.

According to this method, by the reduced-cylinder operation system, the intake/exhaust pumping loss of the engine 1 is reduced, and the heat efficiency of the operating cylinders can be raised and thus, fuel efficiency of the engine 1 can be improved. Moreover, in the normal operation, in accordance with the engine speed and the engine load (or the fuel amount or the engine output), the valve stopping mechanism 21 for reduced cylinders is controlled by the basic map (the high-pressure stage turbo map as illustrated in FIG. 5, for example) or the feedback control and thus, the operation of the engine 1 can be optimized. Moreover, in the case of the idling operation, vibration of the engine 1 can be reduced by operating all the cylinders, and in the case of the deceleration operation and when the fuel amount is zero, a normal engine braking force can be ensured by operating all the cylinders, and a drop of the engine braking force which becomes a problem caused by employment of the reduced-cylinder operation system can be prevented.

Moreover, if EGR for the first cylinder group is performed via the first EGR passage 14A and EGR for the second cylinder group via the second EGR passage 14B, respectively, in response to the reduced-cylinder operation, an EGR gas Ge can be efficiently cooled by the EGR cooler 18A (or 18B) corresponding to the operating cylinder group.

Therefore, according to the above described diesel engine 1, the reduced-cylinder operation system provided with the valve stopping mechanism 21 for temporarily stopping the intake/exhaust valves in addition to the turbo-charging system can be used in the diesel engine for the first time, and the fuel efficiency improvement effect can be obtained.

In the description of the engine 1 in the above described embodiment, the example in which one unit of the low-pressure stage turbocharger 26 is attached on the rear of the turbochargers 16A and 16B of the respective cylinder groups is explained but the system with the increased number of the low-pressure stage turbochargers 26 has the similar effect. Moreover, in FIGS. 1 and 2, the first and second intercoolers 17A and 17B are described on the left and right, but this is illustration for ease of understanding, and the left and right do not necessarily express F (front) and R (rear) in general. Actually, the first and second intercoolers 17A and 17B are cooled by a fan attached on the F side of the engine and an outside air introduced from the F side of the vehicle, and then, these two separate systems, that is, the first and second intercoolers 17A and 17B might be both installed on the F side in many cases.

Moreover, in the above described engine 1, the configuration with the EGR system provided is explained, but the supercharging system of the reduced-cylinder operation can be established even if there is no EGR system. The EGR system has roughly two types, and the above description was made on the basis of the high-pressure EGR (HP-EGR) system. Currently, this high-pressure EGR is used in general, but the effect of the present invention is similar in the low-pressure EGR (LP-EGR) system such that the EGR gas is introduced through a tail pipe out of a vehicle on a recent report, the EGR gas is introduced from the lowermost flow of the first stage turbo or the plurality of turbos and the like. Rather, if the reduced-cylinder operation system is to be introduced, the engine exhaust pressure tends to lower, though it depends on selection of the turbocharger, and the above described high-pressure EGR cannot ensure a sufficient EGR ratio and the low-pressure EGR system is more effective in some cases.

With the diesel engine of the present invention and its operating method, if the reduced-cylinder operation system provided with the valve stopping mechanism for temporarily stopping the intake/exhaust valves in addition to the turbo-charging system, a drop in the supercharging amount during the reduced-cylinder operation can be prevented, a sufficient air amount can be supplied into the operating cylinders, deterioration of combustion in the operating cylinders and deterioration of the state of the exhaust gas which can easily occur during the reduced-cylinder operation can be prevented, and the effect of fuel efficiency improvement can be sufficiently obtained, and thus, the present invention can be used in diesel engines mounted on automobiles and diesel engines for construction machines and power generation and their operating methods.

The invention claimed is:

1. A diesel engine, comprising:
   a first group of cylinders having exhaust valves and intake valves;
   a second group of cylinders having exhaust valves and intake valves;
   a valve stopping mechanism to stop the exhaust valves and the intake valves of one of the first group of cylinders or the second group of cylinders from operating and thereby deactivating the first or second group of cylinders, respectively;
   a controller for the diesel engine;
   a main intake passage that separates at a branch into a first intake passage to the first cylinder group and a second intake passage to the second cylinder group
   a first exhaust passage from the first cylinder group and a second exhaust passage from the second cylinder group;
   wherein the first and second exhaust passages combine at a merge to form a main exhaust passage;
   a first turbocharger connected to the first intake passage and connected to the first exhaust passage;
   a second turbocharger connected to the second intake passage and connected to the second exhaust passage; and
   a third turbocharger connected to the main intake passage on an upstream side of the branch and connected to the main exhaust passage on a downstream side of the merge;
   wherein, on a downstream side of a compressor of the first turbocharger, a first intercooler is provided, and on a downstream side of a compressor of the second turbocharger, a second intercooler is provided, respectively, and
   wherein, the first intake passage on a downstream side of the first intercooler is separate from the second passage on a downstream side of the second intercooler, the first intake passage is connected to an intake manifold of the first cylinder group, and the second intake passage is connected to an intake manifold of the second cylinder group.

2. The diesel engine according to claim 1, further comprising:
   a sensor to detect a speed of the engine;
   a sensor to detect a load on the engine; and
   a sensor to detect a total flow rate of fuel to the cylinders,
   the controller controls the valve stopping mechanism, the first turbocharger, the second turbocharger, and the third turbocharger in accordance with the detected engine speed and the detected engine load during a normal operation; and during an idling operation of the engine, or during a deceleration operation of the engine, and when the detected total flow rate of fuel to the cylinders is zero, activates the first and second cylinder groups, even if the one of the first or second groups of cylinders has already been deactivated.

* * * * *